July 11, 1933.   H. M. GUSDORF   1,917,366
CUT-OFF FOR DISPENSING DEVICES
Filed Aug. 1, 1932   2 Sheets-Sheet 1
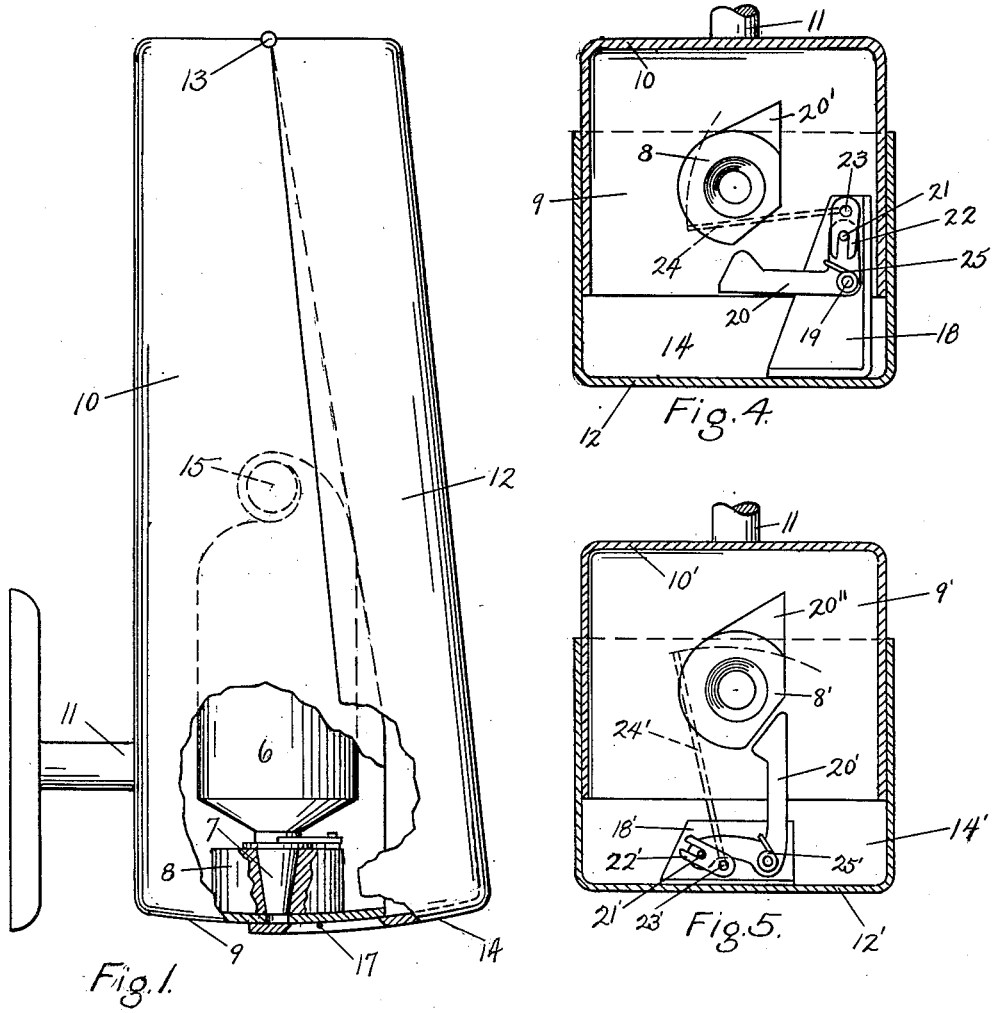

July 11, 1933. H. M. GUSDORF 1,917,366
CUT-OFF FOR DISPENSING DEVICES
Filed Aug. 1, 1932 2 Sheets-Sheet 2
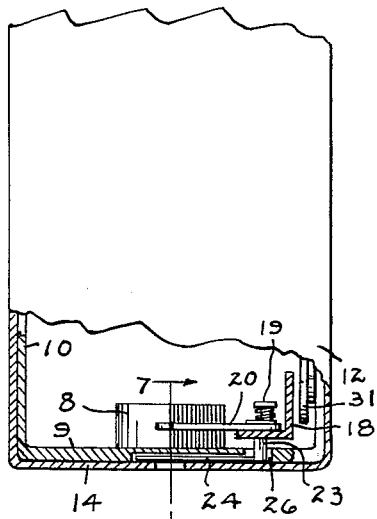
Fig. 6.
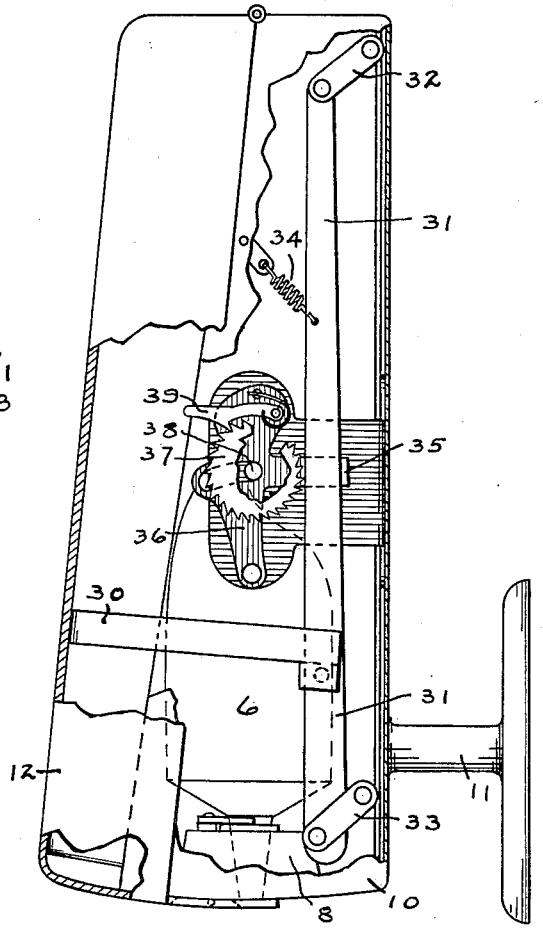
Fig. 7.
Fig. 8.
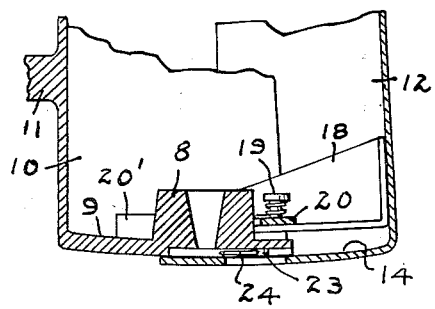
INVENTOR,
Harold M. Gusdorf,
By Minturn & Minturn,
Attorneys.

Patented July 11, 1933

1,917,366

UNITED STATES PATENT OFFICE

HAROLD M. GUSDORF, OF INDIANAPOLIS, INDIANA

CUT-OFF FOR DISPENSING DEVICES

Application filed August 1, 1932. Serial No. 627,228.

In devices for dispensing soap and other materials in paste form, such for example, as shown and described in my application for patent, Serial No. 472,231 filed Aug. 1, 1930, there is a disposition of the measured quantity pressed out of a tube in a cylinder, or pencil of small diameter, to stick to the knife when cut off by a blade of an appreciable width.

The object of this invention is to utilize a cutting instrument of such shape and reduced size that the pull of gravity away from it on the material being severed and hanging down will be so much greater than any adhesive tendency, that the part being cut off will drop away from the cutting instrument without adhering to it.

I accomplish this by utilizing a small wire-like member as a cutter in a manner illustrated in the accompanying drawings, in which Fig. 1 is a view in side elevation of a soap paste dispensing device, broken away in part to show interior mechanism, positioned before any of the contents of a tube has been pressed out;

Fig. 2 is an under side plan view of the device shown in Fig. 1;

Fig. 3 is a fragment showing a lower part of the mechanism after a measured quantity of a tube contents has been ejected and nearly cut off;

Fig. 4 is a transverse section near the bottom of a device similar to that shown in Fig. 1, but with a modified cut off mechanism wherein the cutting wire acts with a swinging movement;

Fig. 5 is a view similar to that of Fig. 4, but with another arrangement for swinging a cut-off wire;

Fig. 6, a detail in fragmentary front elevation of the modified form as shown in Fig. 4;

Fig. 7, a vertical section on the line 7—7 in Fig. 6; and

Fig. 8, a fragmentary side elevation similar to Fig. 1, but showing the operating structure therein in detail.

Like characters of reference indicate like parts in the several views of the drawings.

As shown in Fig. 1, a tube of paste 6, is supported, discharge end 7 down, in a socket in a boss 8 carried by a bottom 9 of a back housing member 10. The housing member 10 uses a bracket member 11 adapted for attachment to a wall for the support of the entire device. A front housing member 12 is hinged at 13 to the upper end of member 10 and is large enough to receive the member 10 with a telescoping fit when the two are swung together on the hinge 13. It has a bottom 14, and it will be noted that both bottoms 9 and 14 are curved on 13 as a center to make a sliding fit with each other. A spring, not shown, normally swings the members 10 and 12 away from each other.

By a suitable mechanism, for example such as is shown in my application for patent above referred to, the upper end of the tube 6 is wound upon a drum 15 by manually pressing the member 12 toward the member 10 to the limit of such movement. The member 12 is normally held in the outer position by means of an arm 30 which by its forward end bears against the inside of the front member 12 and is fixed by its rear end to a vertically positioned bar 31. The bar 31 is rockably secured to a side of the rear member 10 by the top and bottom links 32 and 33 so that, as the bar is lifted and lowered, it has a forward and backward movement also. The bar 31 is normally pulled upwardly and outwardly by a spring 34 which is attached to the side of the rear housing member 10 so that the pull of this spring must be overcome in pushing the front member backwardly. Upon release of the front member 12, the spring 34 will return it to its normal position by pulling outwardly on the bar 31 to carry the arm 30 forwardly against the member 12. When the member 12 is pushed rearwardly, the bar 31 thereby also travelling rearwardly pushes on a lug 35 which is turned laterally from an arm extending back from a rocker 36. A pawl 39 is pivoted on the rocker 36 to drag over the ratchet wheel 37 which is fixed on the shaft 38 that extends from the drum 15 whereby the wheel 37 is revolved by the pawl on the backward travel to wind up the tube 6 on the drum 15 so as to squeeze out a quantity of the contents from the inverted end of the tube. The pawl rides over the wheel on the forward travel without rotating the wheel.

The bottom 14 closes the discharge from the inverted tube 6, in the inoperative condition of the device which is illustrated in Fig. 1, but in farther from the edge is an elongated slot 16, through the far end of which an unsevered column of paste just squeezed out, passes when the member 12 is pushed in. Crossing about the middle of the slot 16 is a wire 17 which has its ends supported by and embedded in the bottom 14. This cut-off wire lies close to the bottom 9 and acts to cut off the projecting paste as the member 12 swings out by the action of the spring when the member 12 is manually released. As the wire 17 cuts through the paste the weight of the depending column tends to swing it down and because of the small surface edge of the wire there is insufficient adhesion to hold up the paste being severed and it drops with a clean cut off. (See Fig. 3).

In the modification shown in Fig. 4, a bracket 18, supported by the movable member 12, supports a post 19 on which a bellcrank lever 20 is pivoted. The inner arm of this lever has a cam-shaped end which contacts on oblique side of the boss 8, thereby swinging the lever. A track continuation 20′ of the flattened boss 8 serves to hold the swing of the lever. The other end of lever 20 carries a pin 21 which enters a slot in the end of an arm 22, which arm is fixed on a post 23 that extends through a slot 26 in the bottom 9 and to it is fixed a wire arm 24. The arm 24 thus has swinging movement on post 23, between the two floors 9 and 14, by contact of lever 20 with boss 8, and by such movements cuts off the column of paste material squeezed out of a tube. The lever 20 is influenced by the spring 25 as the member 12 is pushed inward and before opening 7 is uncovered wire 24 passes rearward and is there held until the paste which has been ejected, is ready for cutting. As member 12 begins to return to its outer position and hurried to the covering up of outlet 7, member 24 moves forward at a greater rate of travel than that of the member 12 and cuts off the projecting paste before the member 12 returns the floor 14 to position under the discharge orifice. In this modification the arm 24 swings in the general direction of the movement of member 12.

In the modification shown in Fig. 5, the arm 24′ swings in a general direction which is transverse to the swing of the arm in Fig. 4, which is accomplished by a somewhat different arrangement of the lever 20′ and arm 22′ and corresponding parts as clearly shown in Fig. 5 which parts will be recognized in the new arrangement in said figure without further explanation.

In all embodiments of my invention the weight of a projected and downwardly hanging portion of a plastic material acts to pull the material away from a cut-off member and I make the cut-off member of such form as to size and shape that the minimum surface will be subjected to the adhesion of the plastic material, thereby enabling the weight to pull it away without allowing it to adhere.

I claim:

1. A cutoff for paste material discharging downwardly from a container, comprising a wire and means for moving the wire against and through the discharging paste, the wire itself contacting and passing through the material performing the cutting thereof.

2. A cutoff for paste material discharging downwardly from a container comprising a wire and means for moving the wire against and through the discharging paste by a swinging movement.

3. In a device for dispensing a paste material from tubes, a tube holding member, a second member movable toward and from the tube holding member to eject a portion of the tube contents, and a wire cutter actuated by the movement of the second member to cut off said ejected portion.

4. In a device for dispensing a paste material from tubes, a tube end cover member, and a paste cutoff wire operated through movement of the cover member and in advance of covering the tube end.

5. In a device for dispensing a paste material from tubes, a tube holding member, a second member normally movable toward the tube holding member, resilient means for normally moving the two members in opposition and a paste cutoff of wire made operative by said resilient means.

6. In a cutoff for paste material discharging downwardly from a tube, a member holding said tube, a second member movable toward and from the tube-holding member, said second member having an opening through which the discharging paste material passes and a cutoff member crossing said opening and having its ends in the second member.

7. In a cutoff for paste material discharging downwardly from a tube, a member holding said tube, a second member movable toward and from the tube-holding member, said second member having an opening through which the discharging paste material passes and a cutoff member swinging across the opening and between the lower ends of the tube-holding member and the second member.

8. In a device for dispensing a paste material which is squeezed out of a container as a depending portion, a cutoff wire, means for moving the wire through said depending portion, and said wire having a surface area sufficiently small to reduce the adhesion of the paste to the cutoff member below the action of gravity upon the depending paste portion being severed.

9. In a cream soap dispenser having a soap container with a discharge orifice, an orifice cover plate, a soap cut-off wire, said plate and said wire being mounted on said dispenser to permit their travel across said orifice, and means for moving said plate and wire in synchronism whereby said wire moves over the orifice in advance of the approach thereto of the plate.

10. In a cutoff for paste material discharging from an orifice, an actuating member, a wire rockably supported to swing over said orifice, and lever means between said actuating member and said wire for quickly swinging the wire across the orifice upon movement of the actuating member.

11. In a cutoff for paste material discharging from an orifice, an actuating member, a wire rockably supported to swing across the orifice, a lever pivoted to said member, and a post in the path of said lever, said lever being linked with said wire to cause the wire to swing quickly across the orifice upon movement of the actuating member to cause the lever to be rocked upon striking said post.

12. In a cutoff for paste material discharging from an orifice, an actuating member, a lever pivotally connected to the member, a post in the path of one end of the lever, a wire rockably mounted to swing across said orifice and linked to said lever to be rocked upon movement of the lever, said lever being rocked by striking the said post upon movement of the actuating member, and a track extending along from a side of the post over which said lever may ride while in its rocked position to prevent return of said wire across the orifice until the actuating member returns to carry the lever away from the post.

In testimony whereof I affix my signature.

HAROLD M. GUSDORF.